United States Patent
Zhao et al.

(10) Patent No.: US 11,133,879 B2
(45) Date of Patent: Sep. 28, 2021

(54) LTE-V BASED INTERNET OF VEHICLES COMMUNICATION TEST SYSTEM AND TEST METHOD THEREOF

(71) Applicant: Chang'an University, Shaanxi (CN)

(72) Inventors: Xiangmo Zhao, Shaanxi (CN); Zhigang Xu, Shaanxi (CN); Runmin Wang, Shaanxi (CN); Dingbei Liu, Shaanxi (CN); Haigen Min, Shaanxi (CN); Lan Yang, Shaanxi (CN); Yu Zhu, Shaanxi (CN); Dongwu Li, Shaanxi (CN); Zhanwen Liu, Shaanxi (CN)

(73) Assignee: Chang'an University, Xi'an (CN)

( * ) Notice: Subject to any disclaimer, the term of this patent is extended or adjusted under 35 U.S.C. 154(b) by 306 days.

(21) Appl. No.: 16/226,125

(22) Filed: Dec. 19, 2018

(65) Prior Publication Data

US 2019/0288781 A1 Sep. 19, 2019

(51) Int. Cl.
*H04W 28/02* (2009.01)
*H04W 8/08* (2009.01)
(Continued)

(52) U.S. Cl.
CPC ......... *H04B 17/318* (2015.01); *H04B 17/101* (2015.01); *H04W 4/40* (2018.02);
(Continued)

(58) Field of Classification Search
CPC ... H04B 17/318; H04B 17/101; H04W 16/18; H04W 24/06; H04W 24/08; H04W 4/40;
(Continued)

(56) References Cited

U.S. PATENT DOCUMENTS

2004/0010545 A1* 1/2004 Pandya .................. H04L 67/34
709/203
2017/0105227 A1* 4/2017 Pinheiro ............. H04W 72/087
(Continued)

FOREIGN PATENT DOCUMENTS

CN          103533559 A   *  1/2014
CN          103533559 A      1/2014
(Continued)

*Primary Examiner* — Edan Orgad
*Assistant Examiner* — Vanneilian Lalchinthang

(57) ABSTRACT

Disclosed is an LTE-V based Internet of Vehicles communication test system and test method. The test system includes an ENodeB base station, a roadside test unit, user test terminal, LTE-V core network and local server group. Mobile communication technology is applied to the field of Internet of Vehicles communication, and two technical schemes are used, i.e., wide-area centralized cellular communication and short-range distributed direct communication corresponding to the network architectures based on access network-user terminal and ProSe direct communication interface, respectively. Not only the communication transmission support with large broadband in wide coverage can be supported, but also to achieve low latency and highly reliable communication services between vehicle and vehicle, vehicle and base station, base station and base station, to meet the needs of road safety and traffic efficiency applications.

4 Claims, 7 Drawing Sheets

(51) Int. Cl.
*H04B 17/318* (2015.01)
*H04B 17/10* (2015.01)
*H04W 4/40* (2018.01)
*H04W 16/18* (2009.01)
*H04W 24/06* (2009.01)
*H04W 24/10* (2009.01)

(52) U.S. Cl.
CPC ........... *H04W 16/18* (2013.01); *H04W 24/06* (2013.01); *H04W 24/10* (2013.01)

(58) Field of Classification Search
CPC ......... H04W 4/44; H04W 4/46; H04W 24/10; H04W 84/22
USPC ........................................................ 370/252
See application file for complete search history.

(56) References Cited

U.S. PATENT DOCUMENTS

| | | | |
|---|---|---|---|
| 2017/0330457 A1* | 11/2017 | Bhalla | G08G 1/096741 |
| 2018/0048577 A1* | 2/2018 | Gulati | H04L 47/24 |
| 2019/0053092 A1* | 2/2019 | Chun | H04W 4/24 |
| 2019/0254050 A1* | 8/2019 | Kusashima | H04W 72/1263 |
| 2020/0107275 A1* | 4/2020 | Cho | H04W 52/325 |
| 2020/0229206 A1* | 7/2020 | Badic | H04W 40/24 |

FOREIGN PATENT DOCUMENTS

| | | |
|---|---|---|
| CN | 107231441 A | 10/2017 |
| CN | 108269412 A | 7/2018 |
| CN | 109362096 A | 2/2019 |
| CN | 106169243 B | 3/2019 |

* cited by examiner

LTE-V BASED INTERNET OF VEHICLES COMMUNICATION TEST SYSTEM AND TEST METHOD THEREOF

CROSS-REFERENCE TO RELATED APPLICATIONS

This application claims priority from Chinese Patent Application No. CN201810206308.X, filed on Mar. 13, 2018, which is hereby incorporated by reference in its entirety.

TECHNICAL FIELD

The disclosure relates to the field of intelligent transportation, in particular to an LTE-V based Internet of Vehicles communication test system and test method.

BACKGROUND

As one of the important subsystems of ITS, the Internet of Vehicles communication system is the key to ensure smooth information channels among the traffic participants, to achieve traffic safety, traffic efficiency improvement and the other functions for the road traffic situation, and to provide passengers with multimedia and mobile internet applications and the other services. At present, most of the existing Internet of Vehicles communication systems employ the DSRC standard, but the DSRC has high latency in information and high packet loss rate in the area where vehicle traffic is dense, and in the high-speed moving scene the Doppler effect is obvious, and the transmission distance is obviously shorter. Compared with DSRC, LTE-V has a significant increase in anti jamming ability due to the involvement of base stations in coordinating resource allocation, especially in areas with heavy traffic, and the support effect of LTE-V for high-speed vehicle movement is better than that of DSRC. In addition, because of the advantages of extensive coverage of mobile communication networks, there is no need to re-build the network and a lot of manpower, material resources and time can be saved. Also, because of mobile network support, LTE-V can also support a number of scenarios that require remote information transmission. However, due to the late start of LTE-V, most of the studies are based on simulation methods to evaluate the performance of the system, there is no examples to use practical method to detect the effectiveness of its transmission, therefore, how to carry out scientific evaluation in the real environment will be an important prerequisite for accelerating the development and marketization of related products.

SUMMARY

The object of the invention is to provide an LTE-V based Internet of Vehicles communication test system and test method, so as to overcome the existing disadvantages.

In order to achieve the above object, the present invention provides an LTE-V based Internet of Vehicles communication test system including ENodeB base station, roadside test unit, user test terminal, LTE-V core network and local server group. The LTE-V core network and the local server group are connected to each other through a convergence switch, and the convergence switch is connected to ENodeB base station. The user test terminal achieves the information interaction with the ENodeB base station wirelessly. The roadside test unit is installed near the runway of the automobile test site, and the roadside test unit achieves the information interaction with the user test terminal wirelessly.

The user test terminal is configured to receive data from other user test terminals, send data to other user test terminals and roadside terminals, or exchange data with the ENodeB base station and stores the data. The ENodeB base station is configured for wireless resource management, IP head compression and user data stream encryption, and the MME selection when UE is attached, the scheduling and transmission of paging information, the dispatching and transmission of broadcast information, radio load control, admission control, connection mobility management, and the allocation and scheduling of dynamic resources on upload link or download link. The LTE-V core network is configured to achieve data exchange processing between the user test terminal and the Internet, and the local server group is configured for data storage processing when LTE-V is in cellular communication.

Further, the user test terminal is installed in the test vehicle. The user test terminal includes a local application module, a communication control module, a multi-mode RF transceiver module, a data transmission module and a data storage module. The local application module is connected to the communication control module. The communication control module is connected to the multi-mode RF transceiver module. The multi-mode RF transceiver module is connected to the data transmission module. The data transmission module is connected to the data storage module. The local application module is configured to switch between the car-following scene communication test applications. According to different test requirements of the test user, the test project can be switched. The communication control module is configured for the transmission of information between the local application module and the multi-mode RF transceiver module, and for the control of the transceiver mode of the multi-mode RF transceiver module. The multi-mode RF transceiver module includes a physical antenna, an RF driven module, an RF module, a positioning drive module and a positioning module, which are configured to receive data from the other user test terminals, send data to the other user test terminals and the roadside terminals or exchange data with the ENodeB base station. The data transmission module transmits the data received by the multi-mode RF transceiver module to the data storage module for centralized storage.

Further, the ENodeB base station is an LTE-V base station equipment. The ENodeB base station embodies a dual-cell configuration, including two sets of antennas, two radio remote unit RRU and a building baseband unit BBU. The building baseband unit BBU and the radio remote unit RRU are connected. The radio remote unit RRU is connected to an antenna. The antenna and the radio remote unit RRU unit are connected by an RF coaxial cable. The building baseband unit BBU and the radio remote unit RRU are connected by an optical fiber cable. The radio remote unit RRU is connected to a DC power supply.

Further, the LTE-V core network includes a MME net element, a SGW net element and a HSS net element, wherein the MME net element: a MME is connected to an ENodeB and a HSS, configured for signaling processing, including paging message distribution, security control, idle state mobility management, SAE load control, non-access layer signaling encryption and integrity protection; the SGW net element is configured for the transmission, forwarding and routing of UE user plane data, and also is embodied as a mobile anchor of the user plane during the transfer between ENodeB, as well as a mobility anchor for the LTE and other 3GPP technology; the HSS net element: a server is configured to store user signing information to manage the user's signing data and the location information of the mobile user.

Further, the SGW net element provides an E-UTRAN oriented interface for forwarding of the data and the classification and labeling of the upstream and downstream transport layer packets in the switching process, and for caching downstream packets and routing and forwarding of the packets during the network being triggered to establish an initial load.

Further, the local server group is embodied for the data storage processing during LTE-V cellular communication. The local server group includes a data transceiver server, a data processing server and a data storage server. The data transceiver server is connected to the LTE core network through an aggregation switch, for the reception and exchange of data between the LTE core network and the local server group during LTE-V cellular communication. The data processing server is configured to process, analyze, and forward the information collected by an on-site vehicle test unit. The data storage server centrally stores the data of the data processing server. The data transceiver server and the data processing server are connected via optical fiber. The data processing server and the data storage server are connected via optical fiber.

Further, the roadside test unit is installed near the driveway of the vehicle test site for relative motion scene testing. The roadside test unit includes an RF transceiver module, a data transmission module and a data storage module. The RF transceiver module is connected to the data transmission module and the data transmission module is connected to the data storage module. The RF transceiver module is configured to receive data from the user's test terminal, including a physical antenna, an RF driven module, and an RF module. The data transmission module transmits the information received by the multi-mode RF transceiver module to the data storage module for centralized storage.

A test method of the LTE-V based Internet of Vehicles communication test system includes:

step 1) setting up an LTE-V based Internet of Vehicles communication test platform, and starting an ENodeB base station, an LTE-V core network and a local server group, and preparing two test vehicles equipped with user test terminal in the test lane of an automobile test site;

step 2) if the wireless communication testing is carried out in LTE-V direct mode, driving two test vehicles equipped with the user test terminal at the speed and direction required by the test project along the road test lane; according to the selected test project, carrying out one-way or two-way packet transmission between two user test terminals or between a user test terminal and roadside test terminal; receiving or sending packets by a multi-mode RF transceiver module; and then sending the received data to the data storage module for compression storage;

step 3) if the wireless communication testing is carried out in LTE-V cellular mode, driving a test vehicle equipped with user test terminal at the speed and direction required by the test project along the road test lane; and according to the selected test project, carrying out one-way or two-way packet transmission between a user test terminal and an ENodeB base station; forwarding the packet to the data transceiver server by the ENodeB base station; and analyzing and processing the received data, generating test results, and storing the test results in the data storage server by the data processing server;

step 4) transferring data from the user test terminal, the roadside test unit, and the local data storage server to a computer for analysis and processing, so as to obtain detailed test results.

Compared with the prior art, the invention has the following beneficial technical effects: the invention discloses an LTE-V based Internet of Vehicles communication test system and test methods. A test platform is constituted by ENodeB base station, roadside test unit, user test terminal, LTE-V core network and local server group. Mobile communication technology is applied to the field of Internet of Vehicles communication, and two technical solutions are applied, i.e., wide-area centralized cellular communication, i.e., LTE-V-Cell, and short-range distributed direct communication, i.e., LTE-V-Direct, corresponding to the access network-user terminal based network architecture and ProSe direct communication interface based network architecture, respectively. Not only the communication transmission support with large broadband in wide coverage can be supported, but also to achieve low latency and highly reliable communication services between vehicle and vehicle, vehicle and base station, base station and base station, to meet the needs of road safety and traffic efficiency applications. The test method of the invention can systematically test part of the performance of the LTE-V network on the test platform. Real vehicle testing in real scene can provide researchers with more realistic and reliable research data, which to a certain extent promotes the research and application of LTE-V communication technology in the field of Internet of Vehicles communication.

DETAILED DESCRIPTION OF EMBODIMENTS

The invention will be further described below in detail in connection with the drawings.

Figure 1:
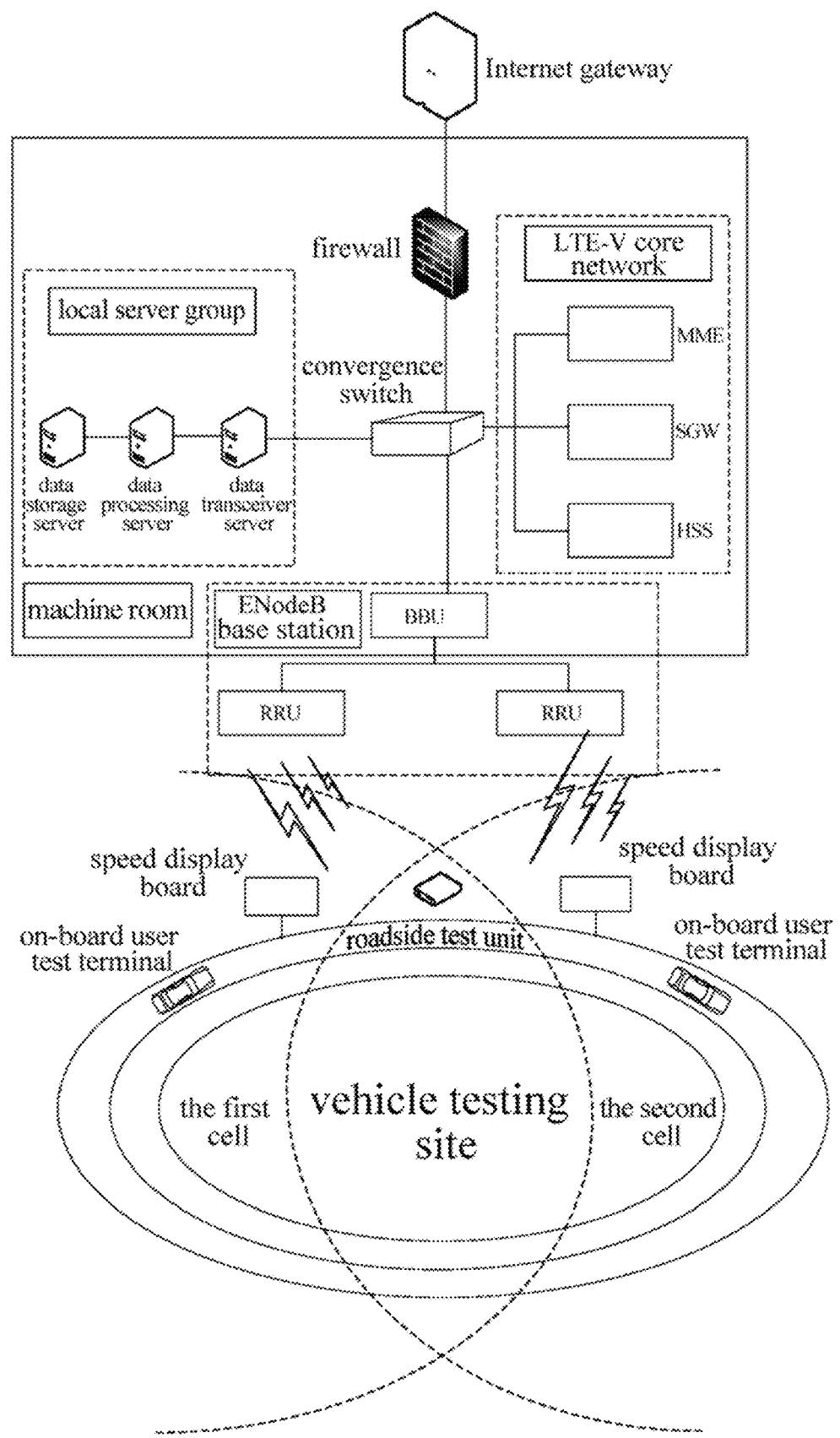
FIG. 1 is a schematic diagram of the Internet of Vehicles communication test platform according to the invention.

As shown in FIG. 1, an LTE-V based Internet of Vehicles communication test system includes ENodeB base station, roadside test unit, user test terminal, LTE-V core network and local server group. The LTE-V core network and the local server group are connected to each other through a convergence switch, and the convergence switch is connected to ENodeB base station. The wireless signal of the ENodeB base station covers the vehicle test site. The user test terminal is installed in the test vehicle and it achieves information interaction with the ENodeB base station wirelessly. The roadside test unit is installed near the runway of the automobile test site, and it achieves the information interaction with the user test terminal wirelessly.

The user test terminal is configured to receive data from other user test terminals, send data to other user test terminals and roadside terminals, or achieve data exchange with the ENodeB base station. The ENodeB base station is configured for wireless resource management, IP head compression and user data stream encryption, and the MME selection when UE is attached, the scheduling and transmission of paging information, the dispatching and transmission of broadcast information, radio load control, admission control, connection mobility management, and the allocation and scheduling of dynamic resources on upload link or download link. The LTE-V core network is configured to achieve data exchange processing between the user test terminal and the Internet, and the local server group is configured for data storage processing during LTE-V cellular communication.

Figure 3:
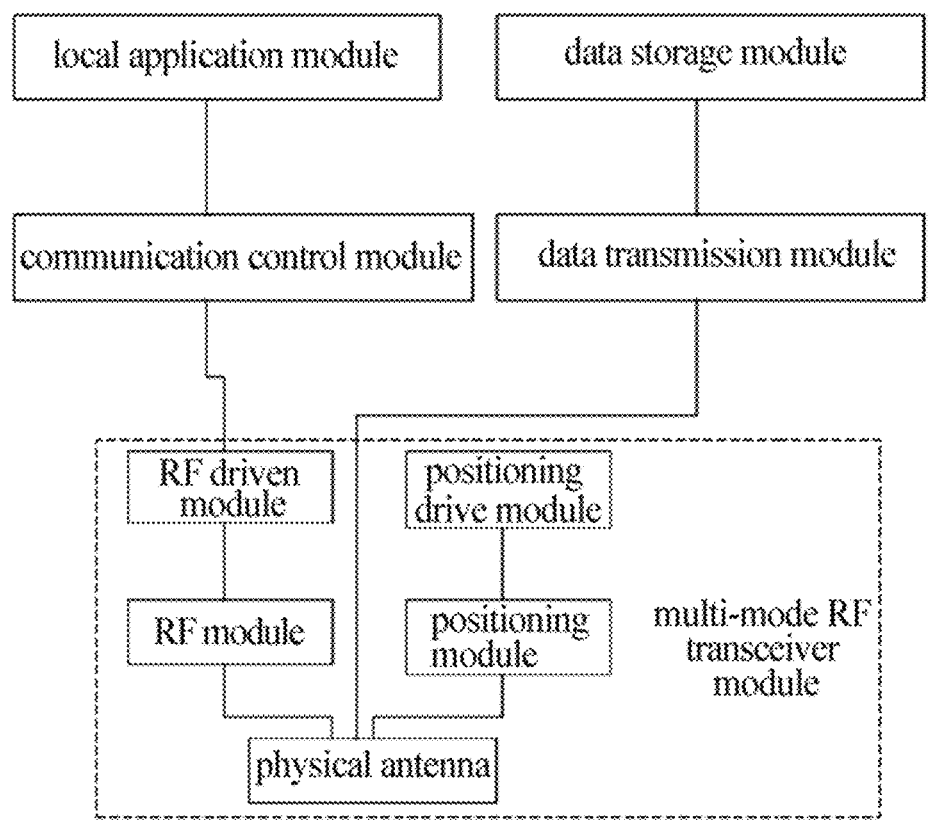
FIG. 3 is a schematic diagram of the construction of the user test terminal according to the invention.

The user test terminal is installed in the test vehicle, as shown in FIG. 3, and the user test terminal includes a local application module, a communication control module, a multi-mode RF transceiver module, a data transmission module and a data storage module. The local application module is connected to the communication control module. The communication control module is connected to the multi-mode RF transceiver module. The multi-mode RF transceiver module is connected to the data transmission module. The data transmission module is connected to the data storage module. The default application of the local application module is the communication test application in car following scene, and according to different test requirements of the test user, the test project can be switched. The communication control module is configured for the transmission of information between the local application module and the multi-mode RF transceiver module, and for the control of the transceiver mode of the multi-mode RF transceiver module. The multi-mode RF transceiver module includes a physical antenna, an RF driven module, an RF module, a positioning drive module and a positioning module, which are configured to receive data from the other user test terminals, send data to the other user test terminals and the roadside terminals or exchange data with the ENodeB base station. The data transmission module transmits the data received by the multi-mode RF transceiver module to the data storage module for centralized storage, so that it may be processed by a computer in a following step.

Figure 2:
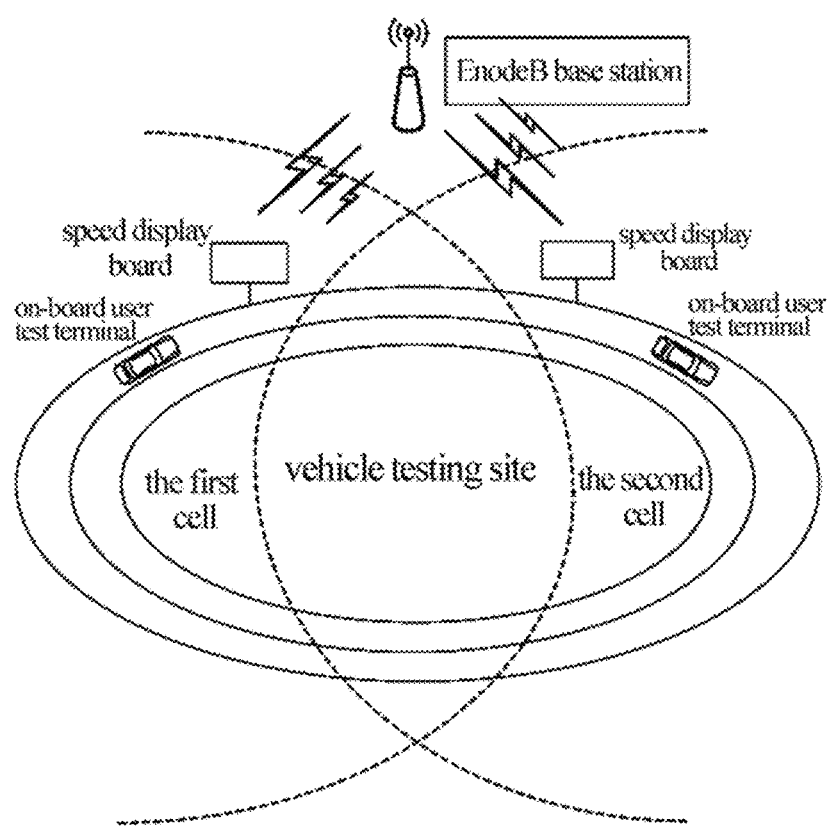
FIG. 2 is a schematic diagram of the configuration of the Internet of Vehicles communication test according to the invention.

As shown in FIG. 2, the ENodeB base station is an LTE-V base station equipment and the ENodeB base station is less than 5 km from the center of the vehicle test site. In order to ensure a full coverage of the vehicle test site by the wireless signal and to achieve influence on the vehicle switching in the cells, the ENodeB base station embodies a dual-cell configuration, including two sets of antennas, two radio remote unit RRU and a building baseband unit BBU. The building baseband unit BBU and the radio remote unit RRU are connected. The radio remote unit RRU is connected to an antenna, wherein the antenna and the radio remote unit RRU are placed at the ENodeB base station about 25 meter high, with an installation orientation of 45 degrees and 270 degrees (the zero degree north as the reference direction). The antenna and the radio remote unit RRU unit are connected by an RF coaxial cable. The building baseband unit BBU is placed in the machine room and the building baseband unit BBU and the radio remote unit RRU are connected by an optical fiber cable. The power cable of the radio remote unit RRU is connected to a DC power supply in the machine room via a feeder window.

The LTE-V core network includes a MME net element, a SGW net element and a HSS net element. MME net element: a MME is connected to an ENodeB and a HSS, configured for signaling processing, with key features including paging message distribution, security control, idle state mobility management, SAE load control, non-access layer signaling encryption and integrity protection; SGW net element is configured for the transmission, forwarding and routing of UE user plane data, and also is embodied as a mobile anchor of the user plane during the transfer between ENodeBs, as well as a mobility anchor for the LTE and other 3GPP technology. On the other hand, SGW provides an E-UTRAN oriented interface, with key features including forwarding of the data in the switching process, classification and labeling of the upstream and downstream transport layer packets, caching downstream packets during the network being triggered to establish an initial load, and routing and forwarding of the packets, etc; HSS net element: a server configured to store user signing information, mainly responsible for managing the user's signing data and the location information of the mobile user.

The local server group is embodied for the data storage processing during LTE-V cellular communication and the local server group includes a data transceiver server, a data processing server and a data storage server. The data transceiver server is connected to the LTE core network through an aggregation switch, for reception and exchange of data between the LTE core network and the local server group during LTE-V cellular communication. The key features of the data processing server are to process, analyze, and forward the information collected by an on-site vehicle test unit. The data storage server centrally stores the data of the data processing server. The data transceiver server and the data processing server are connected via optical fiber and the data processing server and the data storage server are connected via optical fiber.

Figure 4:
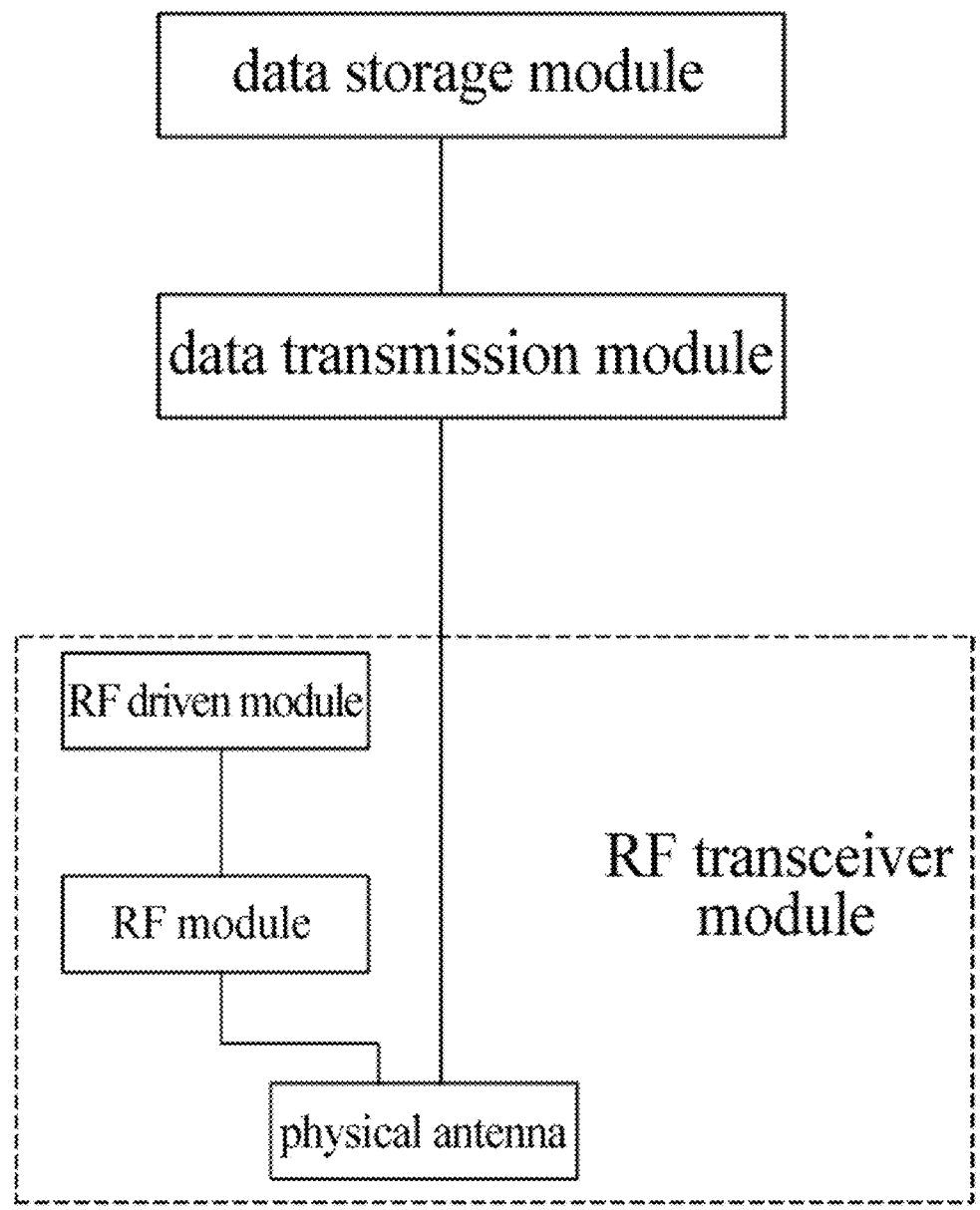
FIG. 4 is a schematic diagram of the construction of the roadside test unit according to the invention.

The roadside test unit is installed near the driveway of the vehicle test site for relative motion scene testing, the construction of which is shown in FIG. 4. The roadside test unit is composed of an RF transceiver module, a data transmission module and a data storage module. The RF transceiver module is connected to the data transmission module and the data transmission module is connected to the data storage module. The RF transceiver module includes a physical antenna, an RF driven module, an RF module, for receiving data from the user's test terminal. The data transmission module transmits the information received by the multi-mode RF transceiver module to the data storage module for centralized storage, so that it may be processed by a computer in a following step.

The vehicle test site provides a real test environment for the test vehicle carrying the user test terminal. The vehicle test site used in the invention has a full 2.4 km vehicle high-speed annular runway and 1.1 km linear test lane, and the test lane width is 8 meters, covering 423 acres.

A lane gantry rack is installed on both sides of the lane 200 meters from the ENodeB base station, and a speed sign is installed on the gantry rack to show the speed at which the test vehicle passes through the gantry. During the test, the driver of the test vehicle can check the current speed according to the speed sign on the gantry rack.

In addition, in the vehicle road communication test platform, BBU equipment of the ENodeB base station, LTE core network, local server group are indoor equipments, placed in the machine room near the ENodeB base station. The machine room covers an area of 12 square meters. In addition to the indoor key equipments of the Internet of Vehicles communication test platform, it also needs to be equipped with firewall equipment, cabinets, cabinet power supply, air conditioning equipment, ventilation equipment and firefighting equipment.

The above-mentioned Internet of Vehicles communication test platform based on LTE-V technology has the following functions:

1. in the vehicle test site, vehicle computer equipment can be connected to the local server group through the user test terminal, and access to the data storage server.

2. in the case of user test terminals connecting with the Internet, other mobile network terminals can access the data stored in the user test terminal or the data in the data storage server in the local server group through the Internet with authorization.

3. other wireless communication systems can coexist in the vehicle test site, and performance test evaluation and comparison may be carried out on relevant equipments under different wireless communication modes at the same time.

Figure 5:
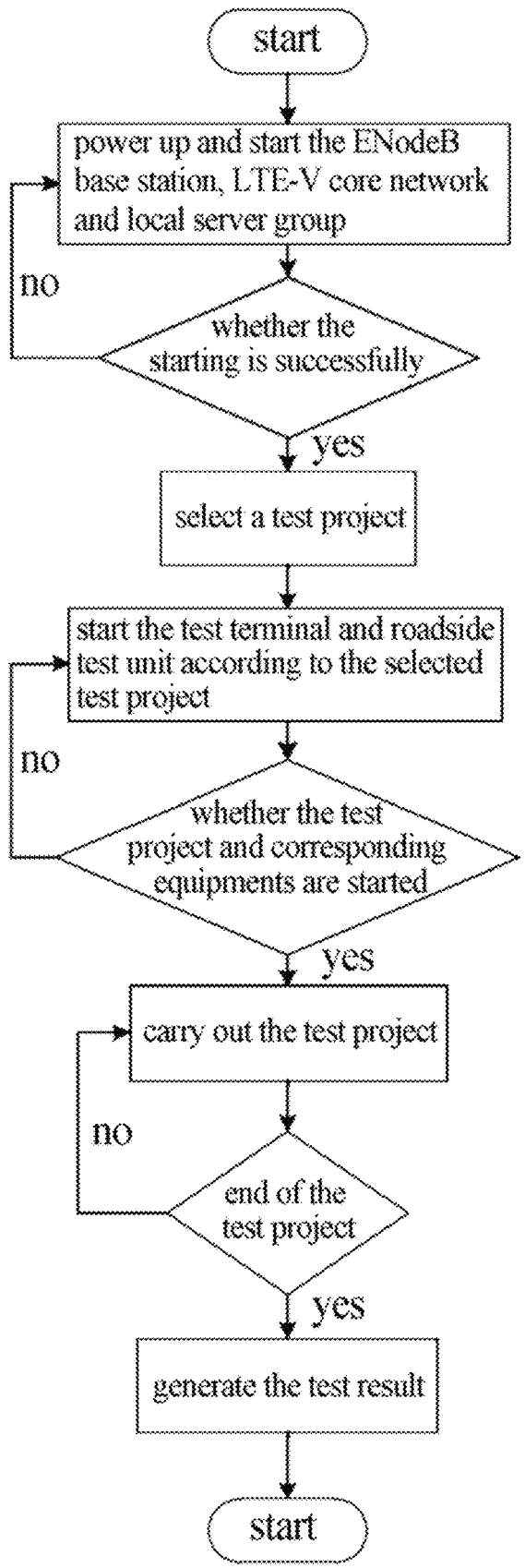
FIG. 5 is a flow chart of the Internet of Vehicles test platform according to the invention.

The workflow of the Internet of Vehicles test platform based on LTE technology is shown in FIG. 5, and it includes:

1. starting the ENodeB base station, LTE-V core network, local server group, and preparing two test vehicles equipped with user test terminal in the test lane of the vehicle test site; Selecting a test mode according to user's needs: if the wireless communication testing is carried out in LTE-V direct mode, powering up and starting two user test terminals and side test terminals; if carrying out the wireless communication testing in LTE-V cellular mode, starting a user test terminal;

2. if the wireless communication testing is carried out in LTE-V direct mode, driving two test vehicles equipped with the user test terminal at the speed and in the direction required by the test project along the road test lane; according to the selected test project, carrying out one-way or two-way packet transmission between two user test terminals or between a user test terminal and roadside test terminal; receiving or sending packets by a multi-mode RF transceiver module; and then sending the received data to the data storage module for compression storage;

3. if the wireless communication testing is carried out in LTE-V cellular mode, driving a test vehicle equipped with user test terminal at the speed and in the direction required by the test project along the road test lane; according to the selected test project, carrying out one-way or two-way packet transmission between a user test terminal and an ENodeB base station; forwarding the packet to the data transceiver server by the ENodeB base station and analyzing and processing the received data, generating test results, and storing the test results in the data storage server by the data processing server;

4. transferring data from the user test terminal, the roadside test unit, and the local data storage server to a computer for analysis and processing, so as to obtain detailed test results.

Figure 6:
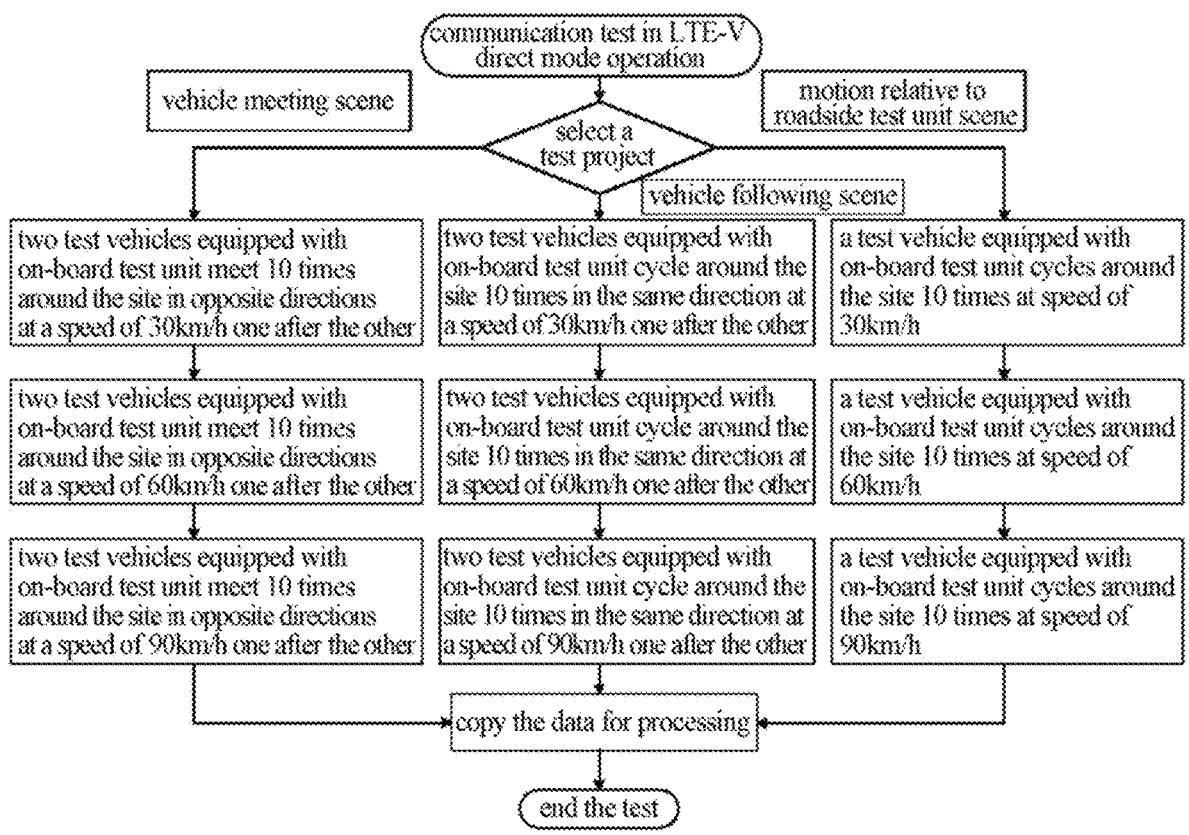
FIG. 6 is a flow chart of communication test in LTE-V direct mode according to the invention.

In the invented test method, the test projects include the communication test in car following scene in LTE-V direct mode, the communication test in car meeting scene, the communication test in relative motion scene, the communication test of single cell in LTE-V cellular mode and the communication switching test of adjacent cells. The contents of the communication test in car following scene in LTE-V direct mode, communication test in vehicle meeting scene, communication test in relative motion scene include the throughput of the user test terminal in movement, RTT delay test. The single cell communication test in LTE-V cellular mode includes the throughput of the user test terminal communicating with the ENodeB base station, RTT delay, packet loss rate test. The contents of the communication switching test between adjacent cells in LTE-V cellular mode are the RTT delay and packet loss rate test when the user test terminal communicates with the ENodeB base station in the process of the test vehicle drives at different speeds. Detailed examples are described below:

1) Communication test in LTE-V direct mode (as shown in FIG. 6)

The test object is the throughput and RTT delay when the user test terminal is in vehicle to vehicle communication during driving. Preset conditions: the on-board test units carried by two test vehicles and the roadside test unit are powered up and started successfully and connected successfully, it specifically includes:

A. Test of throughput and RTT delay of vehicle to vehicle communication between two test vehicles in car following scene a) In the vehicle test site, two vehicles A and B drive around the site at the speed of 30 km/h in the same direction one after the other, and the two vehicles are spaced at a driver-controllable safe distance. The vehicles drive along the experiment runway for 10 successive laps and stop;

b) In the vehicle test site, two vehicles A and B drive around the site at the speed of 60 km/h in the same direction one after the other, and the two vehicles are spaced at a driver-controllable safe distance. The vehicles drive along the experiment runway for 10 successive laps and stop;

c) In the vehicle test site, two vehicles A and B drive around the site at the speed of 90 km/h in the same direction one after the other, and the two vehicles are spaced at a driver-controllable safe distance. The vehicles drive along the experiment runway for 10 successive laps and stop;

d) The data backup in the data storage module of the user test terminal is copied out, and the velocity-throughput profile, speed-RTT delay profile are plotted on the computer by the throughput and RTT delay at different speeds.

B. Test of throughput and RTT delay of vehicle to vehicle communication between two test vehicles in vehicle meeting scene a) In the vehicle test site, two vehicles A and B drive around the site at speed of 30 km/h in opposite directions, and the vehicles drive and meet for 10 times along the runway and stop;

b) In the vehicle test site, two vehicles A and B drive around the site at speed of 60 km/h in opposite directions, and the vehicles drive and meet for 10 times along the runway and stop;

c) In the vehicle test site, two vehicles A and B drive around the site at speed of 90 km/h in opposite directions, and the vehicles drive and meet for 10 times along the runway and stop;

d) The data backup in the data storage module of the user test terminal is copied out, and the velocity-throughput profile, speed-RTT delay profile are plotted on the computer by the throughput and RTT delay at different speeds.

C. Test of throughput and RTT delay of vehicle to road communication in a scene where a test vehicle moves relative to a roadside test unit a) The roadside test unit is installed near a straight lane on the north side of the test site and the test vehicle drives around the site at speed of 30 km/h. The vehicle drives along the experiment runway for 10 successive laps and stop;

b) The roadside test unit is installed near a straight lane on the north side of the test site and the test vehicle drives around the site at speed of 60 km/h. The vehicle drives along the experiment runway for 10 successive laps and stop;

c) The roadside test unit is installed near a straight lane on the north side of the test site and the test vehicle drives around the site at speed of 90 km/h. The vehicle drives along the experiment runway for 10 successive laps and stop;

d) The data backup in the data storage module of the roadside test unit and user test terminal is copied out, and the velocity-throughput profile, speed-RTT delay profile are plotted on the computer by the throughput and RTT delay at different speeds.

Figure 7:
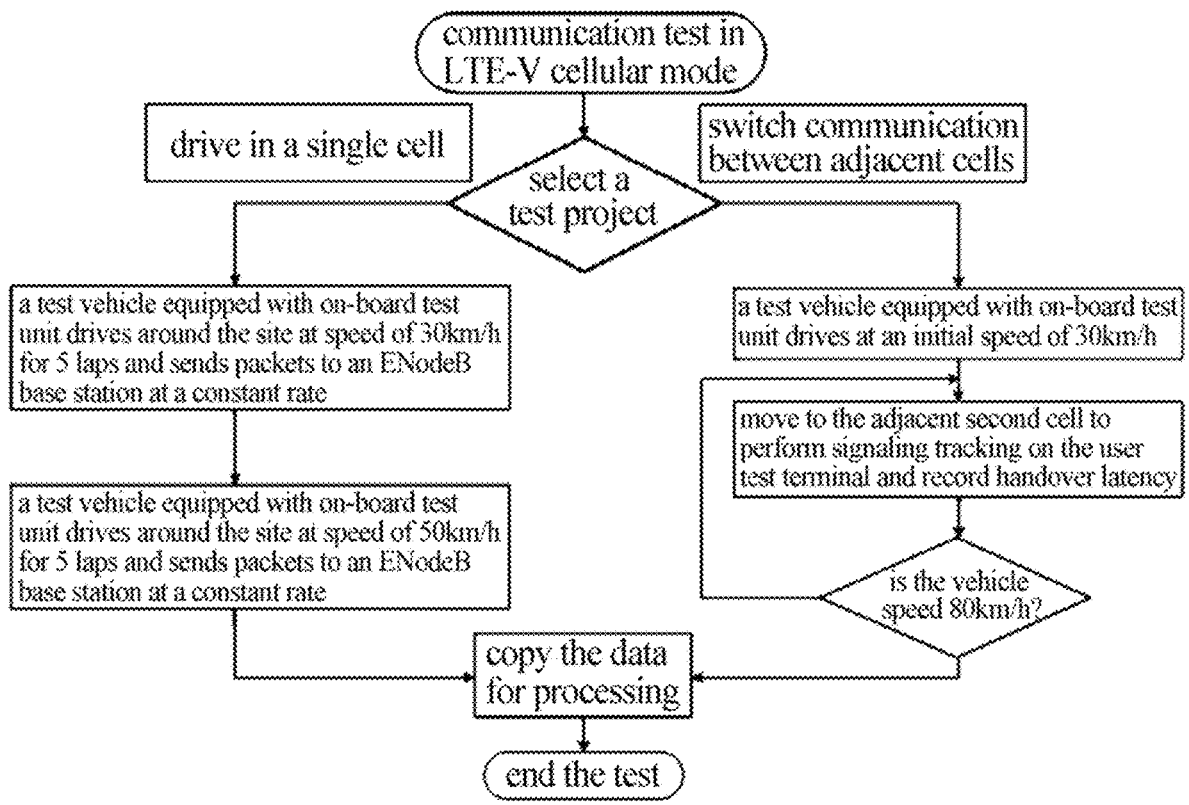
FIG. 7 is a flow chart of communication test in LTE-V cellular mode according to the invention.

2) Communication test in LTE-V cellular mode (as shown in FIG. 7)

The test object is the throughput, RTT delay and packet loss rate when the user test terminal communicates with an ENodeB base station during driving. Preset conditions: the ENodeB base station, core LTE-V network and local server group are in operation, a cell is established and the user test terminal in the test vehicle is powered up successfully and connected to the LTE-V network, it specifically includes:

A. Test of throughput, RTT delay and packet loss rate of communication between the test vehicle and the ENodeB base station while the test vehicle driving in a single cell a) The test vehicle drives around the site for five laps at speed of 30 km/h;

b) The user test terminal transmits data packet to the ENodeB base station at constant rate;

c) The test vehicle drives around the site for five laps at speed of 50 km/h;

d) The data backup in the data storage server in the local server group is copied out, and the velocity-throughput profile, speed-packet loss rate profile and speed-RTT delay profile are plotted on the computer by the throughput and RTT delay at different speeds.

B. Test of RTT delay and packet loss rate of communication between the test vehicle and the ENodeB base station while the test vehicle switching communication in adjacent cells a) The user test terminal in the test vehicle is attached to a first cell, at initial speed of 30 km/h, moves towards a second cell. The signaling of the user test terminal is tracked and the switching latency is recorded;

b) The speed in each test is incremented by 10 km/h until 80 km/h is reached and step (a) is repeated;

c) The data backup in the data storage server in the local server group is copied out, and the speed-RTT delay profile and speed-packet loss rate profile are plotted on the computer by the RTT delay and packet loss rate at different speeds.

The following are the dedicated abbreviations involved in the invention:

Long Term Evolution-V2X (LTE-V)
Intelligent Transport System (ITS)
Dedicated Short Range Communications (DSRC)
Radio Remote Unit (RRU)
Building Base band Unit (BBU)
Round-Trip Time (RTT):
Radio Resource Management (RRM)
Internet Protocol (IP)
User Experience (UE)
Mobility Management Entity (MME)
Serving Gateway (SGW)
Home Subscriber Server (HSS)
Evolved Node B (ENodeB).

What is claimed is:

1. An LTE-V based Internet of Vehicles communication test system, comprising:

at least two test vehicles;

an ENodeB base station, a roadside test unit, a user test terminal provided on each of the two test vehicles, and a LTE-V core network and local server group;

wherein the LTE-V core network and the local server group are connected to each other through convergence switch; the convergence switch is connected to the ENodeB base station; the user test terminal achieves the information interaction with the ENodeB base station wirelessly; the roadside test unit is installed beside the runway of the automobile test site; and the roadside test unit achieves the information interaction with the user test terminal wirelessly;

the user test terminal is configured to receive data from other user test terminals, send data to other user test terminals and roadside terminals, or implement data exchange and storage with the ENodeB base station; the ENodeB base station is configured for wireless resource management, IP head compression and user data stream encryption, MME selection when UE is attached, scheduling and transmission of paging information, scheduling and transmission of broadcast information, radio load control, admission control, connection mobility management, and allocation and scheduling of uplink or downlink dynamic resources; the LTE-V core network is configured to exchange data between the user test terminal and the Internet; and the local server group is configured for data storage during LTE-V cellular communication;

the LTE-V core network comprises a MME network element, a SGW network element and a HSS network element:

the MME network element: a MME is connected to an ENodeB and a HSS, for signaling processing, comprising paging message distribution, security control, idle state mobility management, SAE load control, non-access layer signaling encryption and integrity protection;

the SGW network element: configured for the transmission, forwarding and routing of UE user plane data, and also embodied as a mobile anchor of the user plane during the transfer between ENodeB, as well as a mobility anchor for the LTE and other 3GPP technology;

the HSS network element: a server configured to store user signing information to manage the user's signing data and the location information of the mobile user; and the SGW network element provides an E-UTRAN oriented interface for forwarding of the data in the switching process and the classification and labeling of upstream and downstream transport layer packets, and for caching downstream packets during the network being triggered to establish an initial load and routing and forwarding of the packets, the vehicles communication test system is configured for test of throughput and RTT delay of vehicle-to-vehicle communication between the two test vehicles in car following scene in which the two test vehicles drive around the automobile test site in a same direction one after the other and the throughput and RTT delay are tested, and is further configured for test of throughput and RTT delay of vehicle-to-vehicle communication between the two test vehicles in vehicle meeting scene in which the two test vehicles drive around the automobile test site in opposite directions to meet each other and the throughput and RTT delay are tested.

2. The system of claim 1, wherein the ENodeB base station is a LTE-V base station equipment and embodies a dual-cell configuration; the ENodeB base station comprises two sets of antennas, two radio remote unit RRU and a building baseband unit BBU; the building baseband unit BBU and the radio remote unit RRU are connected; the radio remote unit RRU is connected to an antenna; the antenna and the radio remote unit RRU unit are connected by an RF coaxial cable; and the building baseband unit BBU and the radio remote unit RRU are connected by an optical fiber cable; and the radio remote unit RRU is connected to a DC power supply.

3. The system of claim 1, wherein the local server group is embodied for the data storage processing during LTE-V cellular communication; the local server group comprises a data transceiver server, a data processing server and a data storage server; the data transceiver server is connected to the LTE core network through an aggregation switch, for the reception and exchange of data between the LTE core network and the local server group during LTE-V cellular communication; the data processing server is configured to process, analyze, and forward the information collected by an on-site vehicle test unit; the data storage server centrally stores the data of the data processing server; the data transceiver server and the data processing server are connected via optical fiber; and the data processing server and the data storage server are connected via optical fiber.

4. The system of claim 1, wherein the roadside test unit is installed near the driveway of the vehicle test site for relative motion scene testing; and the roadside test unit comprises an RF transceiver, a data transmitter and a data storage; the RF transceiver is connected to the data transmitter; and the data transmitter is connected to the data storage; the RF transceiver is configured to receive data from the user's test terminal, comprising a physical antenna, an RF driver; and the data transmitter transmits the information received by the multi-mode RF transceiver to the data storage for centralized storage.

* * * * *